J. M. BALDWIN,

Assignor to O. J. BALDWIN.

Snow-Plow.

No. 8,944. Reissued Oct. 21, 1879.

WITNESSES:

W. W. Hollingsworth

Amos W. Hart

INVENTOR:

J. M. Baldwin

BY Munn & Co

ATTORNEYS.

N. PETERS, PHOTO-LITHOGRAPHER, WASHINGTON, D. C.

UNITED STATES PATENT OFFICE.

JOEL M. BALDWIN, OF EVANS' MILLS, NEW YORK, ASSIGNOR TO ORPHA J. BALDWIN.

IMPROVEMENT IN SNOW-PLOWS.

Specification forming part of Letters Patent No. 215,860, dated May 27, 1879; Reissue No. 8,944, dated October 21, 1879; application filed August 28, 1879.

*To all whom it may concern:*

Be it known that I, JOEL M. BALDWIN, of Evans' Mills, in the county of Jefferson and State of New York, have invented a new and useful Improvement in Snow-Plows; and I do hereby declare that the following is a full, clear, and exact description of the same.

My invention is an improvement in the class of railway snow-plows or track-cleaners which are mounted on a truck or car and provided with a rotary device for cutting the snow, and a traveling elevator for removing it from the vicinity of the cutter.

My invention relates to the construction and arrangement of parts, as hereinafter described.

Figure 1:
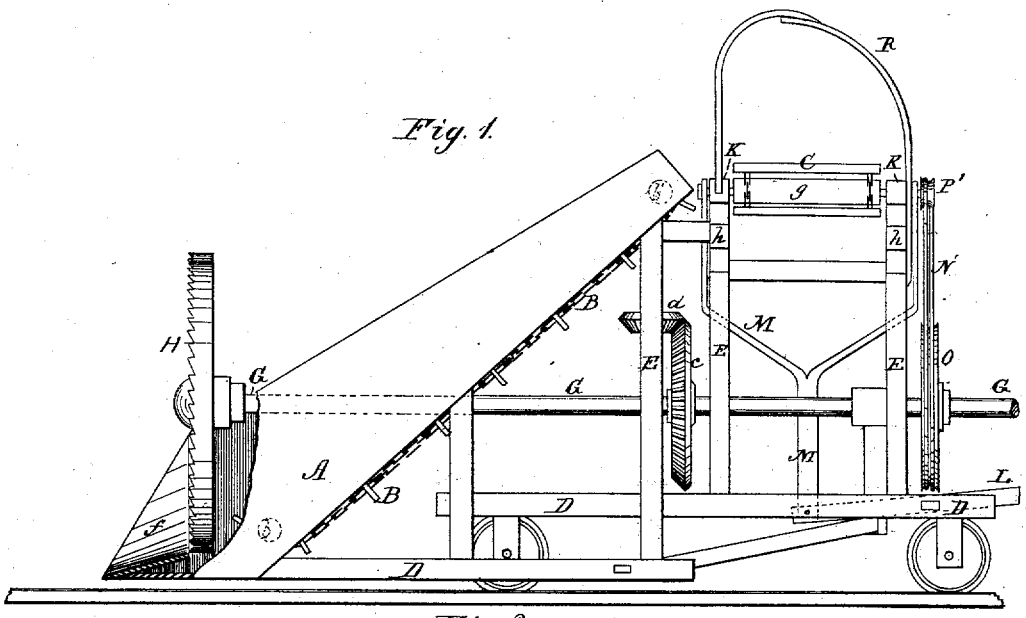
Figure 2:
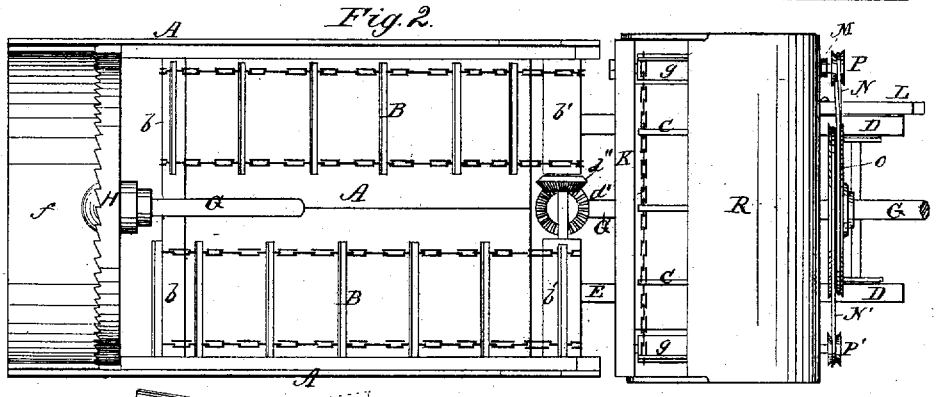
Figure 3:
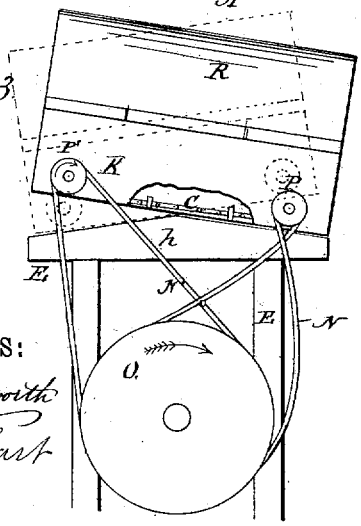
Figure 4:
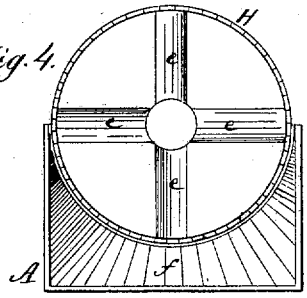

In accompanying drawings, forming part of this specification, Figure 1 is a side view of my improved snow-plow, part of the chute being broken away. Fig. 2 is a plan view. Fig. 3 is a rear view of part of the snow-plow. Fig. 4 is a front view of a part of the snow-plow.

The chute A, elevator B, and lateral carrier or discharger C, together with other co-operating devices constituting the snow-plow proper, are mounted upon a car or truck, D, and in part supported by a frame, E, which is fixed on the latter. The car is adapted to run on a railroad-track. The chute A has straight parallel sides and a flat but inclined bottom, over which the elevators B travel and carry up the snow to the lateral discharger C. Each of the elevators B consists of a pair of endless chains connected by plates, which constitute the buckets or snow-carriers. The elevators run over rollers *b* and *b'*, to which latter motion is imparted from driving-shaft G, through the medium of gears *c* and *d d' d''*, as shown in Figs. 1 and 2. Said shaft G passes through the inclined bottom of chute A, and has a toothed wheel, H, attached to its front end. The rim of the wheel is formed of a thin metal band having saw-teeth on its front edge which project forward in a plane parallel to the axis G. The radial spokes *e* of the wheel are formed of plates having front cutting-edges and set inclined transversely to the axis G, to adapt them to cut the snow and force it backward toward the elevators F.

The lower end of the chute A forms a scoop, *f*, which takes up the snow as the plow advances, and to adapt it for this function it has a particular construction with reference to the wheel H—that is to say, while it is flat or straight on the under side, its upper side is curved, corresponding to the periphery of wheel H, Fig. 4, and its rear edge approaches close to the wheel-rim, whereby it is adapted to cut and take up the snow lying in a plane below the wheel and above the track-rails. If its lower portion were curved like the upper, it is obvious that the portion of the snow lying directly over each rail would not be removed.

The lateral carrier C consists of endless chains having connecting-bars, and passing around rollers *g* at the ends of a frame, K. Said frame is adapted to tilt upon a central support, so as to incline in one lateral direction or the other, to facilitate the discharge of snow at the side of the track. To this end the carrier-frame K is pivoted at the center of its length upon the angle of the cross-bars *h* of frame E. The said cross-bars are arranged parallel, and their upper sides are inclined downward in each direction from the center, such inclined portions forming the required supports for the carrier-frame when the latter is tilted either way.

The means shown for tilting or adjusting the carrier-frame K are the lever L and bifurcated link or connecting-bar M, Fig. 1. The lever is pivoted to the side of the car D, and the link M extends upward from its inner end and is pivoted to the end of frame K. Thus, by raising or depressing the free end of the lever L, the carrier may be made to deliver the snow to one side or the other of the track, at the will of the operator.

The arrangement of means for operating the endless carrier C is shown in Fig. 3, and consists of the crossed belt N, open belt N', and large and small pulleys O P P'. The pulleys P P' are keyed at the corners of frame K, on the journals of the carrier-rolls *g*, and the large pulley O is keyed on the driving-shaft G in the same vertical plane with pulleys P P'. The belts N N' connect the pulley O with the respective pulleys P P'. Thus, when the tilting carrier-frame K is tilted to the right, Fig. 3, the open belt N' will be drawn taut, and the crossed belt N left slack, so that the upper side of carrier C will be caused to travel toward the right, and vice versa, the inclination of the frame K to the left will cause the crossed belt N to become taut and belt N′ slack, so that the carrier C will move in the opposite direction. The carrier C is provided with a hood, R, which is open in front and attached to the frame K.

The operation of the plow, briefly summed up, is as follows: The scoop *f* takes up the snow from the track, the toothed wheel H cuts the crust, ice, &c., the edged spokes *e* pulverize it and force it upon the elevators B, the elevators raise it and deposit it upon the tilting carrier C F, from whence it may be thrown to either side at will, the whole being automatically accomplished by the motive power through the driving-shaft G and its connections.

I do not claim, broadly, the combination of a rotating band or cylinder saw with a snow-plow proper, and I am aware that a spiral conveyer has been arranged to rotate transversely in a scoop formed thereto, and that a spout or conveyer has been pivoted or hinged so as to admit of adjustment in different positions.

What I claim is—

1. In a railway snow-plow, the combination, with the rotating toothed wheel, arranged transversely, of the scoop, whose lower side is inclined longitudinally of the plow and describes a curve from side to side of the chute, which curve is coincident with the periphery of the wheel, as shown and described.

2. In a railroad snow-plow, the combination, with an elevator and chute, of a traveling carrier arranged transversely, and with its frame pivoted centrally upon a suitable supporting-frame, substantially as shown and described, whereby it is adapted to tilt in either direction, as specified.

3. In a railroad snow-plow, the combination, with a traveling carrier and its frame, pivoted so as to tilt to either side, of the double inclines which constitute its support, as shown and described.

4. In a railroad snow-plow, the combination of the open and crossed belts with the driving-pulley, the tilting frame, and the carrier having pulleys keyed on the journals of its rolls, substantially as and for the purpose specified.

5. The tilting frame K, link M, lever L, rollers *g*, pulleys P P′, belts N N′, pulley O, and main shaft G, combined with carrier C, adapted to automatically deposit the snow in either direction at will, as described.

JOEL M. BALDWIN.

Witnesses:

GEO. G. LATIMER,

CALEB SLOCUM.